Figure 1:
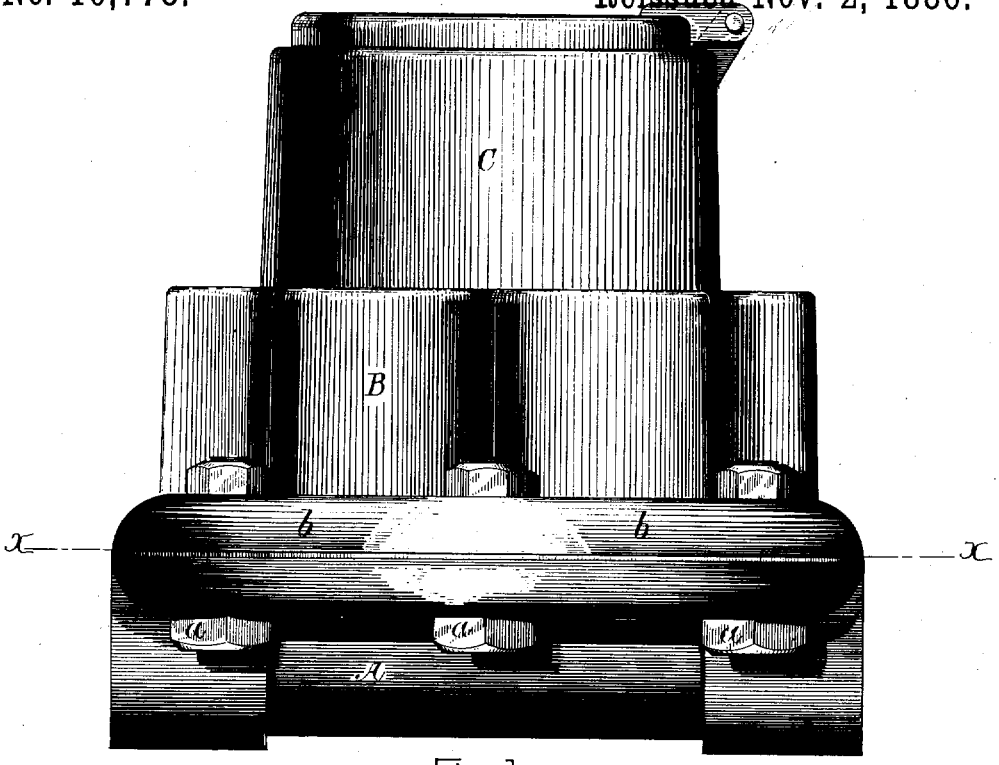

J. A. TILDEN.

Assignor, by mesne assignments, to the HERSEY METER COMPANY.

WATER METER WITH REVOLVING PISTONS.

No. 10,778. Reissued Nov. 2, 1886.

WITNESSES.
F. D. Raymond Jr.
Fred. B. Dolan.

INVENTOR.
James A. Tilden

J. A. TILDEN.

Assignor, by mesne assignments, to the HERSEY METER COMPANY.

WATER METER WITH REVOLVING PISTONS.

No. 10,778. Reissued Nov. 2, 1886.

WITNESSES.

A. F. Raymond Jr.

Fred. B. Dolan

INVENTOR.

James A. Tilden

J. A. TILDEN.

Assignor, by mesne assignments, to the HERSEY METER COMPANY.

WATER METER WITH REVOLVING PISTONS.

No. 10,778. Reissued Nov. 2, 1886.

WITNESSES.

F. F. Raymond

Fred. B. Dolan.

INVENTOR.

James A. Tilden

J. A. TILDEN.

Assignor, by mesne assignments, to the HERSEY METER COMPANY.

WATER METER WITH REVOLVING PISTONS.

No. 10,778. Reissued Nov. 2, 1886.

WITNESSES
F. D. Raymond
Fred. B. Dolan

INVENTOR
James A. Tilden

J. A. TILDEN.

Assignor, by mesne assignments, to the HERSEY METER COMPANY.

WATER METER WITH REVOLVING PISTONS.

No. 10,778. Reissued Nov. 2, 1886.

WITNESSES.

F. A. Raymond Jr.

Fred. B. Dolan

INVENTOR.

James A. Tilden

J. A. TILDEN.

Assignor, by mesne assignments, to the HERSEY METER COMPANY.

WATER METER WITH REVOLVING PISTONS.

No. 10,778. Reissued Nov. 2, 1886.

WITNESSES

F. A. Raymond 2d.

Fred. B. Dolan

INVENTOR

James A. Tilden

J. A. TILDEN.

Assignor, by mesne assignments, to the HERSEY METER COMPANY.

WATER METER WITH REVOLVING PISTONS.

No. 10,778. Reissued Nov. 2, 1886.

WITNESSES.

F. A. Raymond 2d.

Fred. B. Dolan

INVENTOR.

James A. Tilden

J. A. TILDEN.

Assignor, by mesne assignments, to the HERSEY METER COMPANY.

WATER METER WITH REVOLVING PISTONS.

No. 10,778. Reissued Nov. 2, 1886.

$a---b = 1.5$
$a---c = .35$
$a---d = 1.1$
$2.95$
$1.5$
Rotative effect $4.425$ sq. in.

$e---f = 2.6 \times 1.5 = 3.90$
$g---h = .65$
$k---l = .65$
$1.30 \times 1.5 = 1.95$
Contact pressure $1.95$ sq. in.

WITNESSES.
A. F. Raymond Jr.
Fred. B. Dolan

INVENTOR.
James A. Tilden

UNITED STATES PATENT OFFICE.

JAMES A. TILDEN, OF HYDE PARK, MASSACHUSETTS, ASSIGNOR, BY MESNE ASSIGNMENTS, TO THE HERSEY METER COMPANY, OF PORTLAND, ME.

WATER-METER WITH REVOLVING PISTONS.

SPECIFICATION forming part of Reissued Letters Patent No. 10,778, dated November 2, 1886.

Original No. 324,503, dated August 18, 1885. Application for reissue filed September 30, 1886. Serial No. 215,027.

*To all whom it may concern:*

Be it known that I, JAMES A. TILDEN, of Hyde Park, in the county of Norfolk and State of Massachusetts, a citizen of the United States, have invented a new and useful Improvement in Fluid-Meters, of which the following is a full, clear, and exact description, reference being had to the accompanying drawings, forming a part of this specification, in explaining its nature.

It is well known that a fluid-meter, to be practically and commercially successful, must be capable of measuring and registering the quantity of fluid which passes through it under all conditions, that it must not easily get out of repair, that its construction must be simple, and that its manufacture must be inexpensive. Various meters have been made with some, if not all, of these requirements; but, so far as I am aware, there is not at present in the market any meter which combines all of these features with certain necessary wearing qualities to such an extent that it may be said to be a really commercially successful or practical meter; and while my invention may not be perfect in every respect, yet it has all the requisites of an efficient, desirable, and cheap meter.

The invention is embodied in a fluid-meter comprising a stationary chamber having measuring spaces or recesses opening therefrom, the ends of the chamber being closed by fixed parallel heads, whereby the weight and end-pressure on the piston which moves therein are reduced; a piston of less diameter than that of said chamber accurately fitted between said heads, and having lobes or projections equal in number to the chamber-spaces, each lobe moving in and conforming in shape to its space; an inlet-port for the supply to each measuring-space of fluid under pressure, and outlet-ports at each end of the piston extending from each measuring-space to an escape-passage, whereby the piston is balanced in its function as a fluid-actuated valve. If the piston is placed centrally within the chamber, its irregular peripheral surface will be concentric to the opposed interior surface of the chamber, and the distance between said surfaces will be the radius of the extent of the piston's movement, which movement and its contact result not from mechanical means, but from hydraulic action of the fluid in passing through the meter, during which time the piston is eccentric within the chamber.

The meter can hardly be called a "rotary" meter, because the piston does not rotate on its own axis, although it does revolve about the center of the case, and yet it is quite unlike in appearance any of the ordinary reciprocating-piston meters; but it combines, it may be said, portions of both systems in substantially this manner. The measuring-chamber of the meter is divided or separated upon its outer edge into measuring spaces or recesses, all of which open into the central portion of the chamber, but which may or may not be of uniform size and shape. Each of these spaces has its individual inlet and outlet ports. The part which I call the "piston" has radially-extending portions or lobes, each of which enters its measuring space or recess and does not at any time leave its recess, and has a movement therein that causes it to be brought into contact with one side of its recess near the mouth, and to advance along the side continuously until it reaches the other side of the recess, when it returns across the mouth of the recess or space to its original position. This movement of each lobe in each space or recess alternately exposes and closes the outlet-ports, thereby preventing the flow of liquid from the chamber only after it has entered what may be termed the "measuring" and "discharging" spaces or recesses.

The piston performs a double duty. It not only acts to form measuring-spaces and to discharge their contents, but the portions thereof which cover the outlet-ports also act as the valves of the piston-chamber, in that they serve alternately and in successive order to valvularly control or open and close the outlet-ports; and as it is essential that the piston should move in the piston-chamber with as little friction as possible, I have arranged the outlet-ports in the stationary or fixed heads or plates, so that the piston is balanced as regards end-pressure in the piston-chamber between two opposed or equalizing pressures exerted against its ends or end surfaces.

To understand the working of the device it must be borne in mind that the fluid has free access to the chamber—that is, its inlet-ports are never entirely closed; that because of the shape of the wall of the chamber and of the piston the piston is kept in contact with the wall of the chamber at a number of what I call "contact-lines," which form the changing limits of measuring and discharging passages, spaces, or recesses. The number of lines of contact depends, of course, upon the number of spaces or recesses. This separation or division of the chamber is necessary, because a full head is maintained in the larger part of the chamber, and it is of course necessary to divide the spaces or recesses or portions thereof which are successively emptied from those which are being successively filled by fluid under pressure. This division is accomplished by contact of the piston with the wall of the chamber. The lobes, in connection with the portions of the wall which constitute or form the spaces or recesses, also act to separate the outlet-ports from the inlet-ports, so that each space or recess that is discharging is separated from the portion of the space that is filling by two contact-lines—one between the outer surface of the lobe and the wall of the recess and the other between the surface of the inward projection of the wall and the surface of the piston between the lobes. These lines of contact continually advance until the fluid has been expelled from each space or recess. While, however, this discharge from each space or recess is going on by the movement of the lobe, the space or recess is filling behind the lobe. Of course the number of spaces or recesses which are discharging simultaneously depends upon the entire number of spaces or recesses which the chamber contains, and there may be several recesses or spaces discharging and receiving at the same time. This advancing movement of the lobe in each space or recess does not continue beyond its individual space, but upon reaching the end of that space or recess it returns across the mouth or entrance of its recess or space to its original position, while the piston as a whole, without rotating on or about its axis, moves on a circular path.

The contact-lines of the piston, in the operation of dividing the chamber into measuring spaces or recesses and discharging the same, are always upon the same side of the piston, and these contacting lines are brought successively into operation, not by rotation of the piston, but by the successive reverse movements of the lobes, so that the piston, while appearing like a rotating piston, is in principle like a reciprocating piston, in that each of its lobes or projections is caused to enter a measuring space or recess, advance therein, empty it, and return to its original position, to again advance in the said space or recess and empty. In making this movement the contact between each lobe and the wall is not maintained during the reverse movement of each lobe or projection. The piston in other respects has more of the principle of a reciprocating piston than of a rotating piston, in that each lobe or projection operates as a separate or distinct piston or discharging device in connection with its respective space or recess, so that, the recess or space being filled with liquid, the lobe enters it and presses the liquid therefrom through the outlet-ports. In other words, each lobe or projection does not act to displace the liquid from the spaces or recesses like a plunger, but to discharge the liquid therefrom by an advancing movement from one end of the chamber or recess to the other, like a piston.

Figure 2:
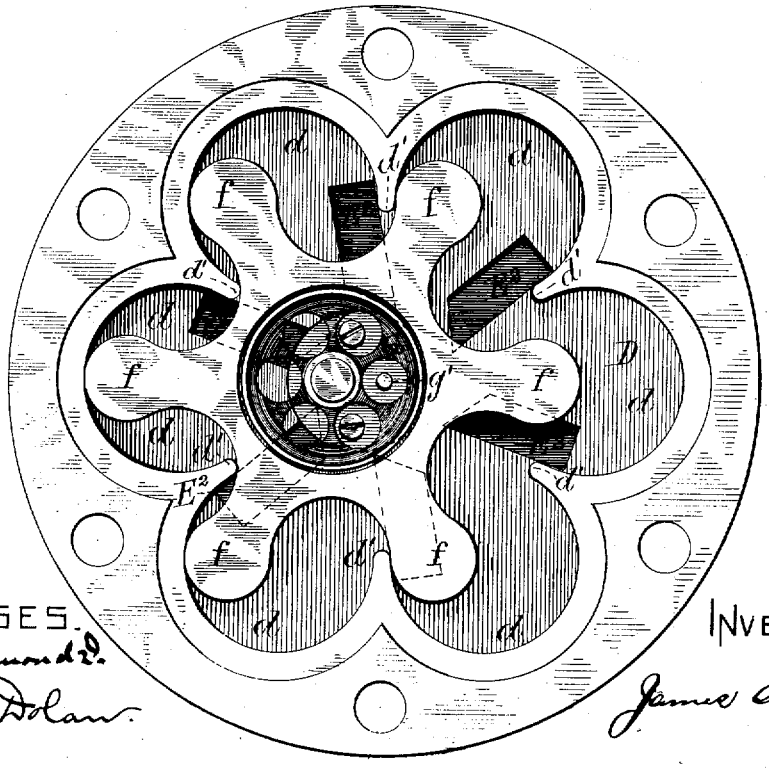
Figure 20:
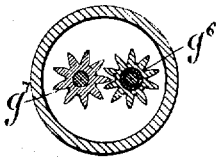
Figure 21:
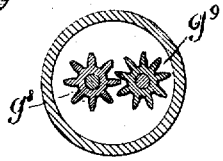
Figure 3:
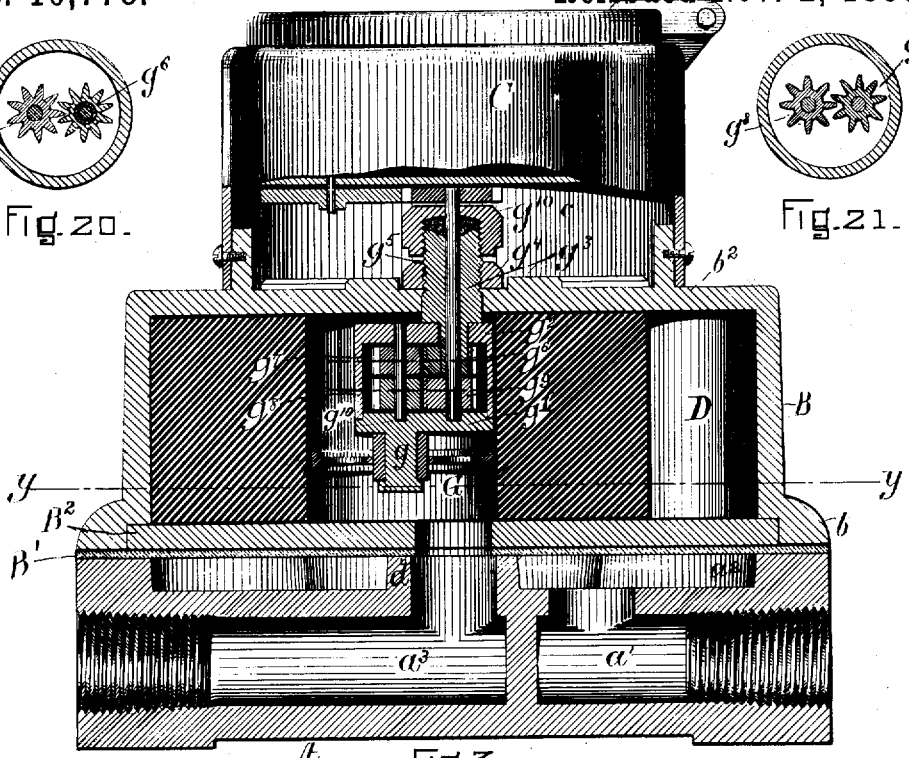
Figure 4:
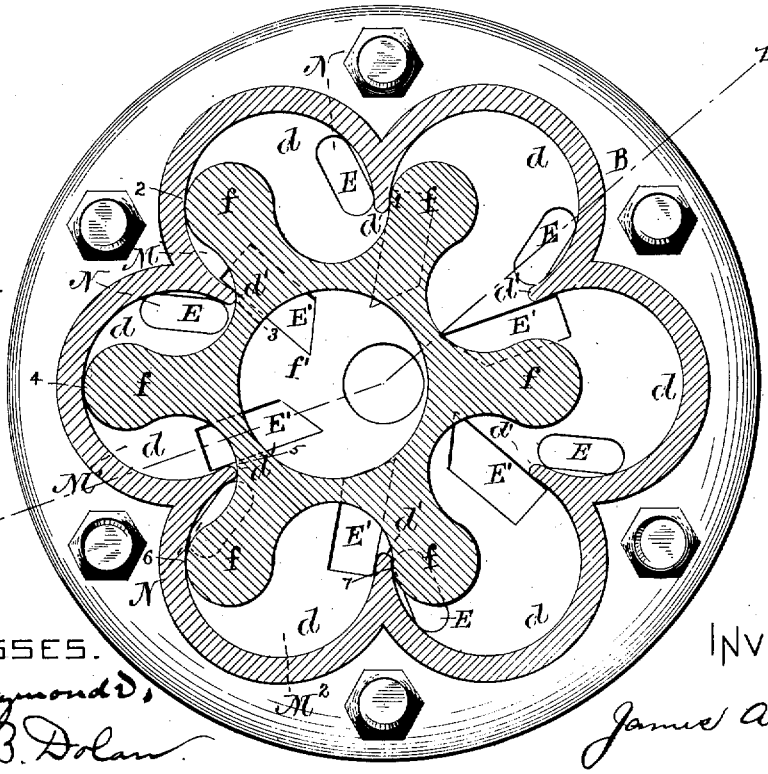
Figure 5:
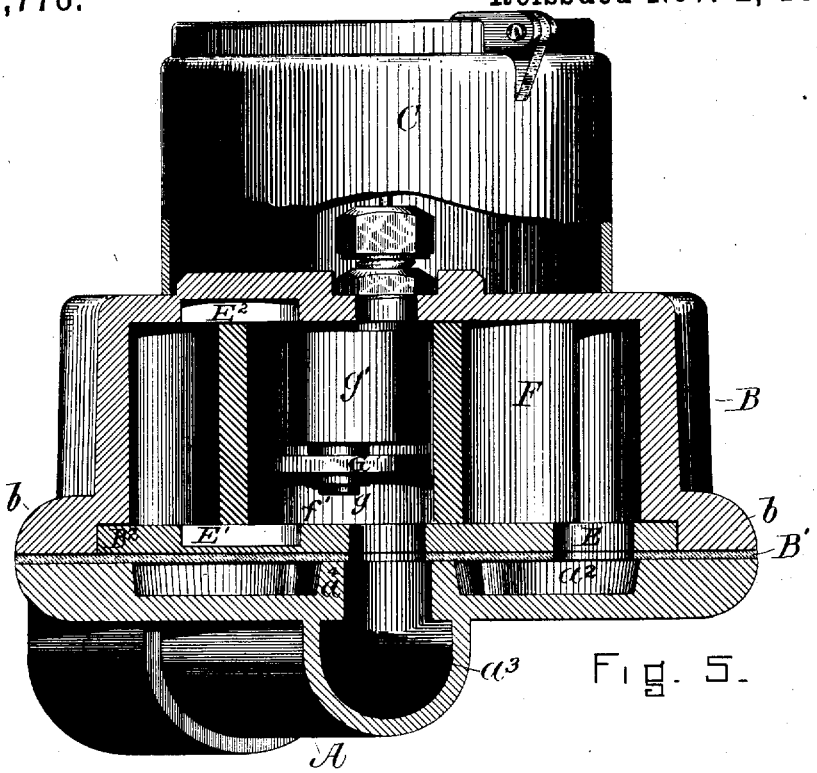
Figure 6:
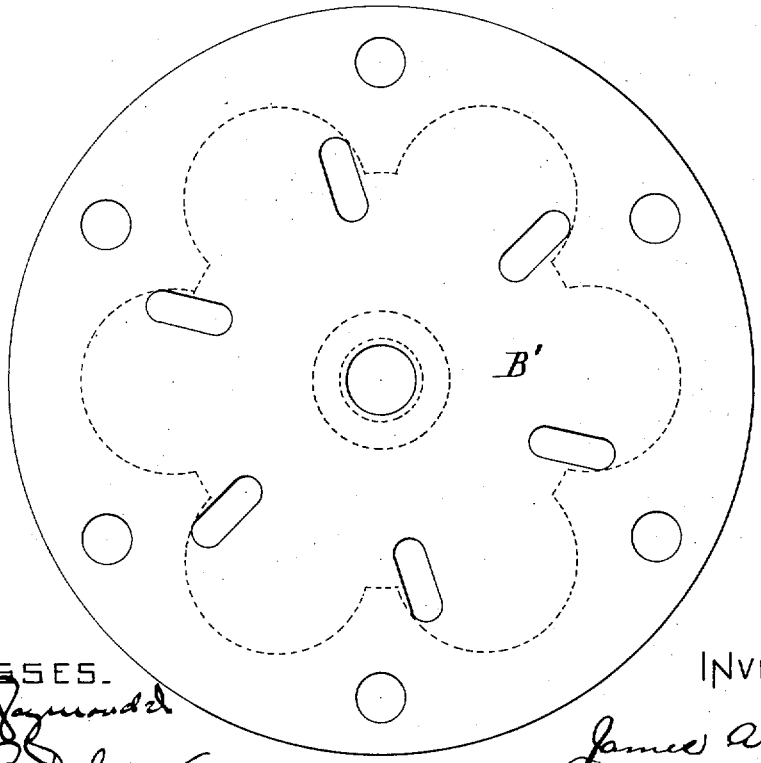
Figure 7:
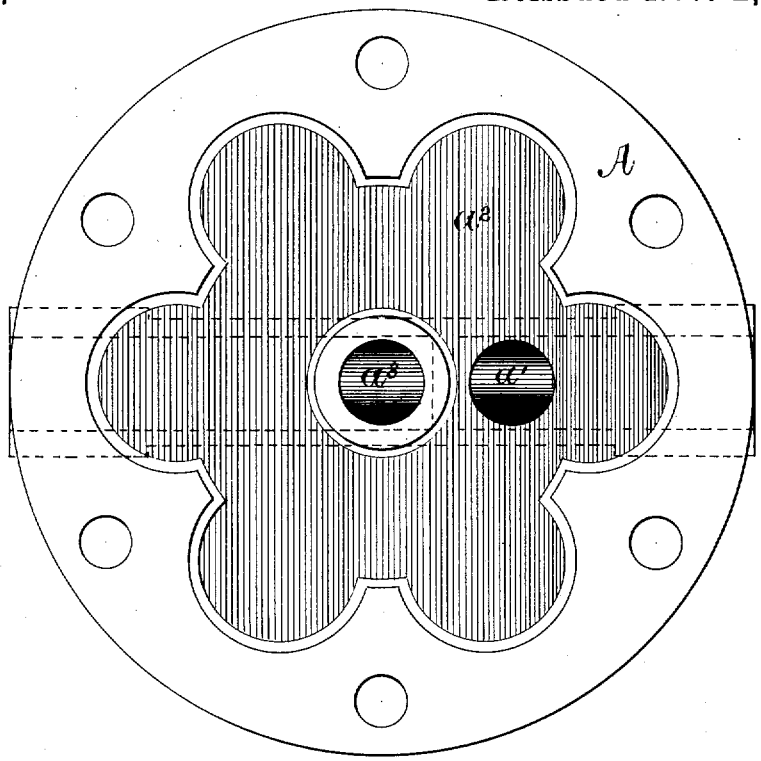
Figure 8:
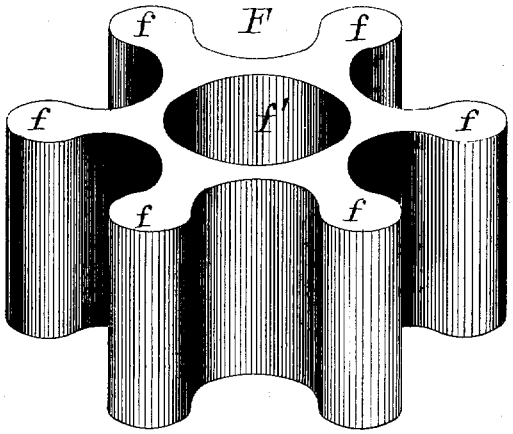
Figure 9:
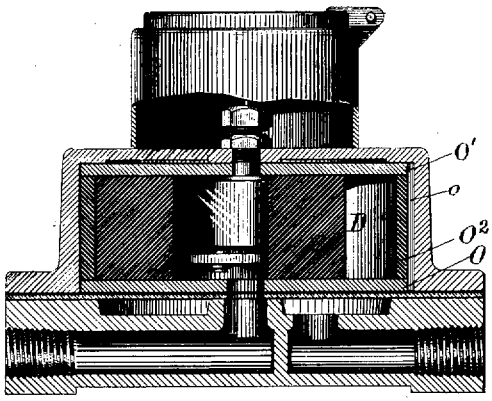
Figure 10:
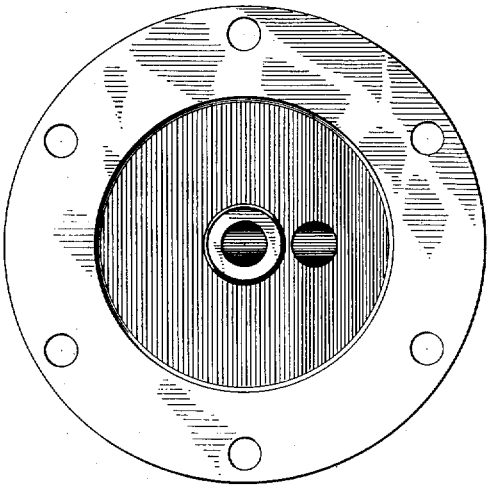
Figure 11:
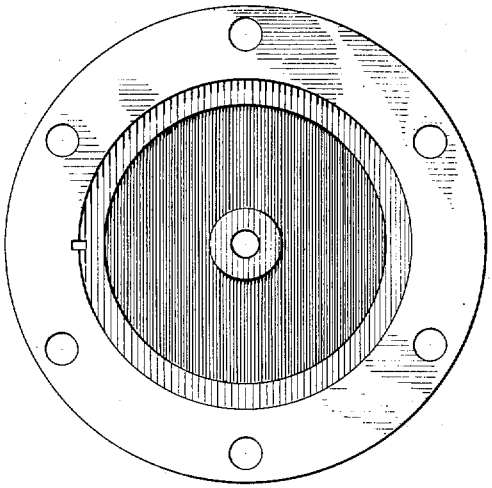
Figure 12:
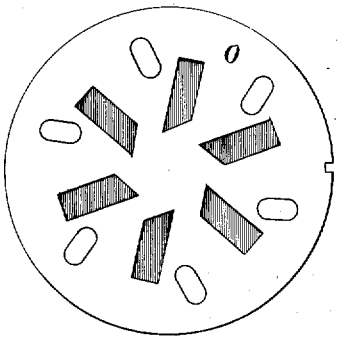
Figure 13:
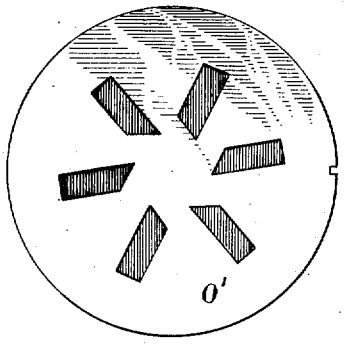
Figure 14:
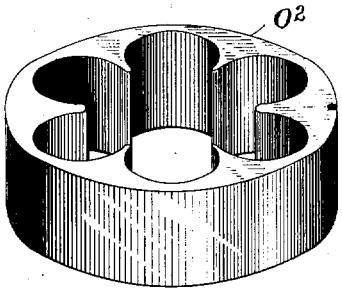
Figure 15:
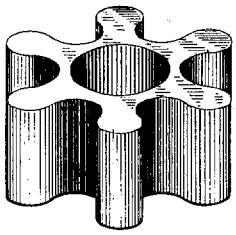
Figure 22:
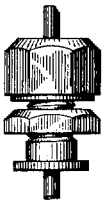
Figure 16:
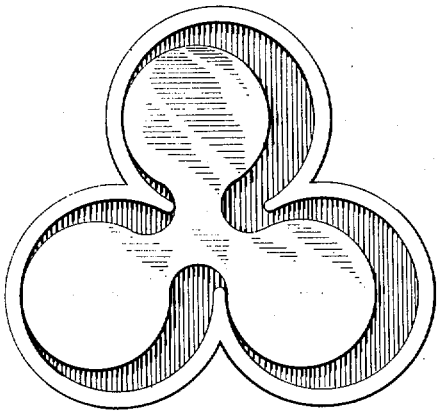
Figure 17:
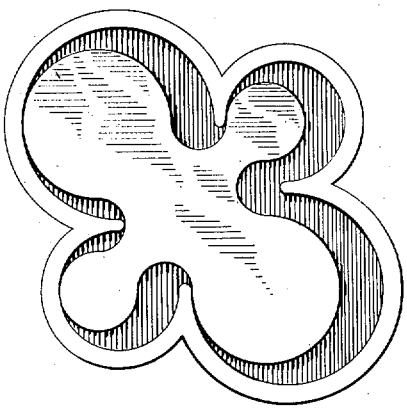
Figure 18:
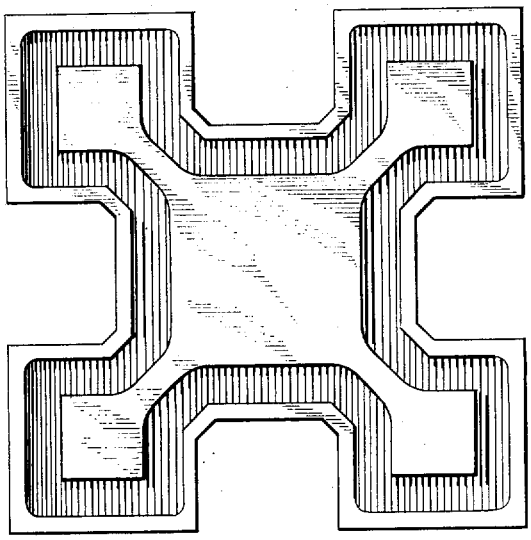
Figure 17:
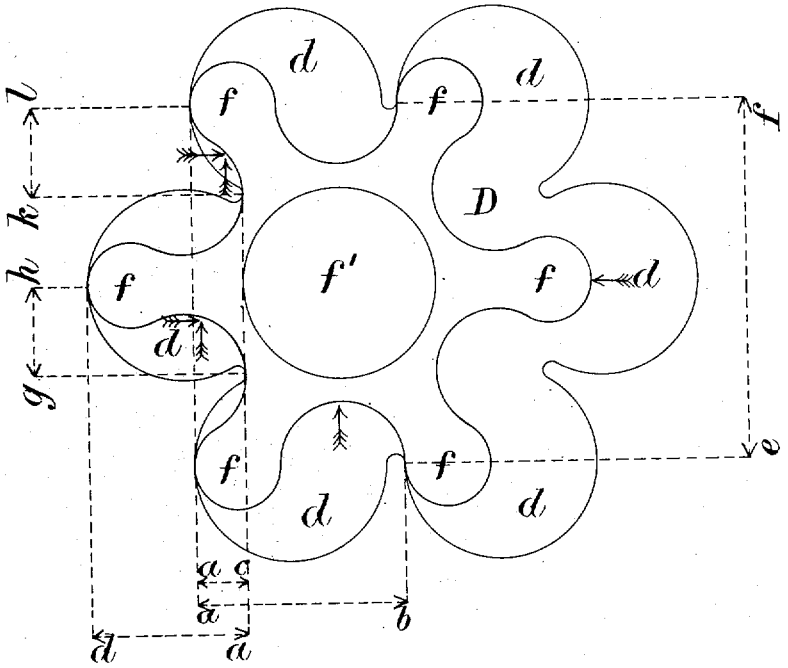

In the drawings, Figure 1 represents a side elevation of the machine. Fig. 2 is a plan view of a portion of the meter above the line *x x* of Fig. 1, inverted, showing the piston and upper series of outlet-ports. Fig. 3 is a view, principally in vertical central section, showing, especially, the mechanism for connecting the piston with the registering-train. Fig. 4 is a section upon the line *y y* of Fig. 3, also showing the lower series of outlet-ports and the inlet-ports. Fig. 5 is a view, principally in vertical section upon the lines *z z* of Fig. 4, showing, especially, the relation of the outlet ports, meter-walls, and spaces or recesses when discharging. Fig. 6 is a plan view of the packing-piece between the base and main sections of the meter. Fig. 7 is a plan view of the base-section, showing the receiving-chamber and the inlet and outlet passages. Fig. 8 is a perspective view of the piston. Figs. 9 to 15, inclusive, illustrate special details of a modified form of construction. Figs. 16, 17, and 18 are diagrams showing that changes in the form and size of the chambers, spaces, and pistons do not vary the principle of the construction. Fig. 19 is a diagram showing by calculation the differences in pressure which cause the action of the meter. Figs. 20 and 21 are sections of the reducing-gears hereinafter described, and Fig. 22 is a view of the sleeve forming the support of the drum carrying the gears.

Preferably the casing of the meter comprises three principal parts or sections: first, the base-section A; second, the body or main section B, and, third, the shell C, forming the chamber *c*, containing the registering mechanism.

The base-section is made somewhat larger in circumference than the main section, and the two parts are fastened together by bolts *a*, which pass through the flange *b* of the main section. The base-section has the inlet-passage *a'*, which opens into the distributing-chamber $a^2$ and the outlet-passage $a^3$. The distributing-chamber $a^2$ occupies almost the entire upper portion of the base, and its object is to provide means for the ready distribution of fluid simultaneously through the various inlet-ports to the main chamber D.

Between the sections A B is a packing-piece, B', which is shaped as shown in Fig. 6, and is provided with holes for bolt-holes, the inlet-ports, and outlet-passage. Above this packing is a metal plate or head, $B^2$, which may be called a "port-plate." It rests upon the packing B', and is held or fastened in place upon it and the upper surface of section A, surrounding the chamber $a^2$ and the central projection, $a^4$, by the bolts $a$, the plate being within the main section B, and its edge projecting into a recess formed in the under edge thereof. This port-plate has the holes E, which form the inlet-ports to the chamber D and connect the distributing-chamber $a^2$ therewith. These ports E are arranged, preferably, to open into each space or recess $d$ of the chamber D at one side thereof. The port-plate also has a central hole, which forms a portion of the outlet $a^3$ and the outlet-ports E', which are recesses formed in the upper surface of the plate and arranged to extend from one side of each recess or space $d$ inward upon converging lines. The chamber D has the measuring recesses or spaces $d$ arranged about its outer edge, which open into the central portion, and the projections or portions of the wall of the chamber which form spaces or recesses I have lettered $d'$. The piston F preferably is made of hard vulcanized india-rubber, gutta-percha, or other equivalent material, and has the wings or lobes $f$, which extend radially therefrom. The central hole, $f'$, of the piston forms a part of the outlet-passage, and is large enough to always permit the escape of fluid therefrom into the outlet $a^3$, regardless of the position of the piston.

In addition to the lower set of outlet-ports, E', I have formed in the under surface of the head or upper plate, $b^2$, which forms the top of the main section B, another set of outlet ports, $E^2$. (Shown in Figs. 2 and 5.) They are of the same shape and connect the same parts of the spaces or recesses with the opening $f'$ as the lower exhaust-ports, E'.

It will be seen that each measuring space or recess is connected with the outlet-passage by two outlet-ports, E' $E^2$, formed by depressions or recesses in the plates or heads $B^2$ $b^2$, and arranged so that the fluid in the measuring-spaces escapes between the port plates or heads and the ends of the piston. It will be seen, further, that if one set only of outlet-ports were employed the pressure of the fluid upon one end of the piston would be less than that exerted against the other end, and the piston would be pressed against the head or plate having the outlet-ports, and the resulting friction would interfere with the advantageous working of the piston. To obviate this friction I make use of opposed outlet-ports arranged at opposite ends of the piston, or in the opposite stationary heads of the fixed case, which results in bringing equal balancing pressures upon the piston ends, thus balancing and floating the piston endwise between two opposed fluid-pressures of equal force. There is also arranged in the hole $f'$ a perforated disk, G, (see Figs. 2 and 3,) by which motion is communicated to the shaft which operates the train of gears comprising the registering mechanism. This disk carries at its center a stud, $g$, which projects downward from the drum $g'$, which is pivoted at $g^2$ to the screw-sleeve $g^3$, which passes through the hole in the plate $b^2$, and is locked thereto by the nut $g^4$, which screws upon the thread $g^5$, and the movement of the piston causes the drum to be revolved upon the sleeve. It is necessary, however, as the chamber is of small capacity, and as the motion of the piston is rapid, to reduce the motion of the piston very considerably; and it is desirable to do so in as simple a manner and with as few parts as possible, in order that the construction may be cheap and as little weight of metal used as possible, and I employ for this purpose a train of four gears, one of which, $g^6$, is stationary, being secured to the end of the sleeve $g^3$. The gears $g^7$ $g^8$ are attached to the drum by the shaft $g^{10}$, to which they are fastened, and the gear $g^7$ meshes with the gear $g^6$. The gear $g^8$ is arranged to mesh with the fourth gear, $g^9$, which is fastened to the spindle $g^{10}$, which communicates motion to the registering-train. As the drum revolves about the sleeve $g^3$, it is obvious that if the gear $g^7$ has more or less teeth than the gear $g^6$ it will be caused to move each revolution of the drum a certain portion of a revolution, depending upon the difference in the number of teeth between the two gears. It is also obvious that if the gears $g^8$ $g^9$ have the same number of teeth as the gear $g^7$ a movement of rotation will be communicated to the shaft or spindle $g^{10}$.

If it is desired to still further reduce or change the rate of the rotation of the shaft $g^{10}$, then the gear $g^8$ may have more or less teeth than the gear $g^7$, as the case may be, as also may the gear $g^9$; and in the drawings I have represented the gear $g^6$ as provided with ten teeth, the gear $g^7$ with nine teeth, the gear $g^8$ with eight teeth, and the gear $g^9$ with nine teeth, so that upon every complete revolution of the drum the shaft $g^{10}$ is moved one eighty-first of a revolution, and it therefore requires eighty-one revolutions of the drum to make one complete revolution of the shaft, the spindle or shaft $g^{10}$ being used, of course, to operate any registering mechanism.

It will be seen by this construction of gearing that the drum $g'$, carrying the gears $g^7$ $g^8$, revolves from left to right, and that the gear-wheels $g^7$ $g^8$, being carried by the drum, are caused by the meshing of the gear $g^7$ with the stationary gear $g^6$ to turn from right to left, and that the meshing of the gear $g^8$ as it is turned upon its revolution about the gear $g^9$ causes the gear $g^9$ to be moved, as above specified, one eighty-first of a revolution for each revolution of the drum and the gears $g^7$ $g^8$ about it.

It will be observed that by making the mechanism for reducing the movement of the piston in compact form I am enabled to place it in the measuring-chamber and within the hole formed in the piston, thereby economizing space.

In operation the liquid passes into the distribution-chamber $a^2$, and through the inlet-ports E into the chamber D, moving the piston toward one side of the chamber, and causing the formation of measuring or discharge spaces by the contact of the various portions of the piston with the chamber-wall. This position of the piston is well shown in Fig. 4, where there have been formed six divisions of the three spaces or recesses *d* by the contacting of the piston at the points 1, 2, 3, 4, 5, 6, and 7, and of these three recesses or spaces two—namely, the small spaces marked M and the space M'—are connected by the discharge-ports E' E' E' E' with the escape-passage, while the space M' is about to be; but the fluid, upon being admitted to the chamber under pressure, not only immediately moves the piston to the position shown in Fig. 4, which is one of any number of positions which it might cause it to assume, and from such position it causes it to advance or move so that the lobes which are in contact with the wall of the chamber are caused to continue that contact until they have expelled all the fluid which is in the discharge spaces or recesses before them, when each lobe in succession will leave the surface and return upon an arc of a circle to a position where it again comes in contact with the surface of the wall of the chamber on the opposite side from that which it left, and again advances and expels the fluid from its recess or space.

It will be seen that each recess or space becomes in succession a discharge space or recess, and that as soon as the piston has moved sufficiently to uncover the inner end of its outlet-ports it begins to discharge through such ports into the escape-passage $a^2$, and that while a portion of each space or recess is discharging another portion is also receiving the liquid under pressure through the ports E.

To illustrate why with the arrangement of the inlet and outlet ports described the piston is compelled to make the motion that it does, I have shown in Fig. 19 by diagrams the differences in pressure upon both sides of the piston and the extent of the surface which is subjected to the direct pressure of the entering fluid.

It is obvious that the chamber D, excepting the spaces which are discharging, is filled with fluid under pressure, and that the pressure for moving the pistons is that which enters each space or recess which is being discharged and behind the respective discharging-lobe. For instance, referring to Fig. 4, the piston is receiving motion from the fluid which enters the spaces through the ports marked N N N, but from no other. It is not necessary that the main chamber and piston be shaped as represented in Fig. 4, for I have ascertained that the piston may have any number of lobes and recesses, from three upward, and that they may be of any size and of different sizes for the same piston, the only difference to be observed being that the piston and chamber-wall must be so shaped as to provide the contact-lines in the surface of the piston or chamber wall, whereby the formation of measuring-chambers is effected.

In Fig. 16 I have illustrated a piston having three lobes in a chamber having three measuring and discharge spaces or recesses. In Fig. 17 I have shown a piston with two large lobes and two small ones and a chamber with corresponding recesses or spaces. In Fig. 18 I have represented the piston as having square lobes and the chamber with spaces which substantially follow the shape of the lobes, the only variation being that they are rounded at the corners.

It will be obvious from what I have stated that the meter is very simple in construction; that it has but very few parts, which require but little machine-work, and are easily fitted and put together; and it is also apparent that a substantially perfect registration of the liquid which passes through the meter is obtained, as it all is obliged to pass into the measuring-spaces, which are successively emptied. It will be seen, further, that this measuring of the liquid takes place very rapidly and with the minimum of friction of the wearing parts, and that the construction of the piston and chamber is such that sediment cannot interfere with the proper working of the invention, and that wear, up to a certain extent, improves the efficiency of the meter, in that it causes the contacting surfaces of the piston and chamber to fit themselves as they wear.

To still further cheapen the manufacture, I show in Figs. 9 to 15, inclusive, a construction which enables me to use, instead of the comparatively expensive casing of composition, an iron casing. This I accomplish by making the base-section entirely of iron, employing two composition port-plates, O O', the plate O being like that described, and the plate O' having simply the exhaust-passages E'. The piston is made of hard rubber, gutta-percha, or other like non-corrosive material, and the wall O' (see Fig. 14) of the chamber D is formed of a ring or sleeve of gutta-percha, hard india-rubber, or even of composition, which is fitted into the iron shell or casing of the main section. This non-corrosive movable wall of the chamber is fastened to the casing by means of a key, *o*, which enters a groove in the ring and a corresponding one in the inner surface of the iron shell, or in any other suitable way. A view in perspective of the movable wall is shown in Fig.

It will be seen that by this construction not only can an iron shell be employed, but that the principal wearing parts—namely, the port-plates, the piston, and the wall of the chamber—may be easily removed and others substituted therefor. The port-plates are also held in place by suitable keys, or in any other desirable way, and it will be observed that they extend upon the two end surfaces of the removable wall. (See Fig. 9.)

While the invention as shown in the drawings represents a piston which, while not rotating, moves in a circular path, yet by changing the forms of the piston lobes and the shape of the walls of the chamber the piston may be made to take a square, rectangular, elliptical, or any other shape, the conditions governing these various movements depending entirely upon the shape of the surface of the piston, the surface of the wall of the chamber, and the relation which they bear to each other; but while these different movements may be given to the piston, the principle of its action is not changed, as the lobe or portion of the piston which penetrates the measuring-space will have a continuous movement in said space, whether its path be circular, square, rectangular, elliptical, or of any other shape. In this construction the piston in motion is held in changing lines of contact with the internal irregular surface of the fixed case by hydraulic action, as illustrated by the diagram, Fig. 19, and the calculation there noted, so that, while the piston is controlled in its movement by contact with the fixed case, it is free to depart from such contact, being held thereto only by fluid-pressure, and not by mechanical means—such as cranks, links, abutments, &c.—and so can move over obstructions interposing between the irregular peripheral surface of the piston and the opposed surface of the fixed case without causing the piston to jam and cease motion and without risk of breakage or of strain of any part.

Of course the invention can be utilized as a pump or motor, if desired.

Having thus fully described my invention, I claim and desire to secure by Letters Patent of the United States—

1. A fluid-meter having a stationary piston-chamber with measuring-recesses opening therefrom, each separately provided with inlet and outlet ports, and having a movable piston fitted, as described, in said chamber, with lobes conforming to the chamber-recesses, each lobe entering and moving in but one recess, and adapted to be held and moved in contact with the walls thereof by hydraulic action, as specified, and having parallel stationary heads or plates, whereby end-pressure on the piston is relieved and weight of the moving parts is reduced, substantially as set forth.

2. A fluid-meter having a stationary piston-chamber with measuring-recesses opening therefrom, each separately provided with inlet and outlet ports, and having a movable piston fitted, as described, in said chamber, with lobes conforming to the chamber-recesses, each lobe entering and moving in but one recess, and adapted to be held and moved in contact with the walls thereof by hydraulic action, as specified, and having the opposed arrangement of the ports, whereby balanced valvular action is effected, substantially as set forth.

3. A fluid-meter having a stationary piston-chamber with measuring-recesses opening therefrom, each separately provided with inlet and outlet ports, a movable piston fitted, as described, in said chamber, with lobes conforming to the chamber-recesses, each lobe entering and moving in but one recess, and adapted to be held and moved in contact with the walls thereof by hydraulic action, as specified, parallel stationary heads or plates, whereby the weight of the piston is reduced and end-pressure thereon is relieved, and an opposed arrangement of the ports, whereby balanced valvular action is effected, substantially as described.

4. In a fluid-meter, the piston-chamber having measuring recesses or spaces forming a part thereof, a piston, F, having a projection or lobe entering each of said spaces or recesses, which projections or lobes are adapted to be brought successively into contact with the walls of said spaces or recesses and to be moved therein, and the contact maintained during the discharge of the liquid from each space or recess by the direct pressure in the piston-chamber, as specified, a register, and devices connecting the piston with the register, all substantially as and for the purposes set forth.

5. In a fluid-meter, the piston-chamber having measuring spaces or recesses forming a part thereof, the stationary port-plate $B^2$, a distributing-chamber having an inlet, $a'$, the passages or inlet-ports E in the said stationary port-plate $B^2$, connecting the distributing-chamber with the measuring spaces or recesses of the piston-chamber, and a piston having a separate or distinct lobe or projection, which enters each of said measuring spaces or recesses, and is operated or moved and its contact maintained by the excess of pressure, as herein set forth, all substantially as and for the purposes described.

6. In a fluid-meter, the combination of the distributing-chamber $a^2$, its inlet $a'$, the piston-chamber D, having measuring recesses or spaces $d$, the uncontrolled ports or passages E, connecting the distributing-chamber $a^2$ with the recesses or spaces $d$, the outlet-ports $E'$ $E^2$ and escape-passage connected therewith, and the piston F, having the lobes or projections $f$, one for each of the measuring spaces or recesses $d$, and operated or moved therein to maintain contact during the discharge of the liquid from each space or recess by the direct pressure in the piston-chamber, as specified, all substantially as described.

7. In a fluid-meter, the independent or separate base-section containing the inlet-passage $a'$, the distributing-chamber $a^2$, and the outlet-passage $a^3$, with the independent or separate section B, containing the piston-chamber D, having the measuring recesses or spaces $d$, connected with the distributing-chamber and outlet-passage, as described, and the piston F, having a lobe or projection for each of said spaces or recesses, and the bolts for fastening the two sections of the meter together, all substantially as and for the purposes described.

8. The combination of the section A, having the distributing-chamber $a^2$, the section B, and the removable port-plate $B^2$, having the inlet-ports E and outlet-ports E'.

9. In a meter, the combination of the section A, having the distributing-chamber $a^2$, the section B, containing the measuring-chamber, the port-plate $B^2$, and the packing-ring B'.

10. In a fluid-meter, as a means for communicating the motion of the piston to the register, the mechanism described, consisting of the stationary gear $g^6$, the revolving gears $g^7$ $g^8$, adapted to be revolved around the stationary gear by the piston, and the gear $g^9$ upon the connecting-spindle.

11. The combination of the piston F, the disk G, the drum or frame $g^2$, pivoted as described, to be revolved, and the differential gears inclosed within said drum or case.

12. The combination, in a fluid-meter, of the piston-chamber D, the piston F, the reducing mechanism or gearing for transmitting the motion of the piston to the registering device contained in a recess in the piston, and the registering mechanism, all substantially as and for the purposes described.

13. A fluid-meter having a piston chamber with measuring-recesses opening therefrom, each separately provided with inlet and outlet ports, and having a piston fitted and moving as and for the purpose described, with lobes conforming to the chamber-recesses, and serving alternately and in successive order to valvularly control or open and close the outlets formed in the heads and piston.

JAMES A. TILDEN.

Witnesses:
F. F. RAYMOND, 2d,
FRED. B. DOLAN.